United States Patent
Bruckmann et al.

(10) Patent No.: US 6,620,217 B2
(45) Date of Patent: Sep. 16, 2003

(54) CENTRIFUGAL SEPARATOR FOR SEPARATING OFF WATER

(75) Inventors: Willi Bruckmann, Oberhausen (DE); Martin Klenböck, Ratingen (DE)

(73) Assignee: Balcke-Dürr Energietechnik GmbH (DE)

(*) Notice: Subject to any disclaimer, the term of this patent is extended or adjusted under 35 U.S.C. 154(b) by 0 days.

(21) Appl. No.: 10/147,778

(22) Filed: May 16, 2002

(65) Prior Publication Data
US 2002/0189995 A1 Dec. 19, 2002

(30) Foreign Application Priority Data
Jun. 19, 2001 (DE) .......................... 101 29 198

(51) Int. Cl.[7] .............................................. B01D 45/12
(52) U.S. Cl. ...................... 55/347; 55/348; 55/413; 55/448; 55/486; 96/208; 210/512.1
(58) Field of Search .................. 55/347, 348, 413, 55/447, 448, 456; 210/512.1, 188; 209/717, 725; 96/268

(56) References Cited

U.S. PATENT DOCUMENTS 4,200,443 A * 4/1980 Marjollet et al. ............ 55/347
4,280,825 A * 7/1981 Marjollet et al. ............ 55/347

FOREIGN PATENT DOCUMENTS

EP    0 002 235 A1    6/1979
EP    0 005 494 B1    11/1979

* cited by examiner

Primary Examiner—David A. Reifsnyder
(74) Attorney, Agent, or Firm—R. W. Becker & Associates; R W Becker

(57) ABSTRACT

A centrifugal separator is provided for separating water out of wet steam, and comprises a first cylindrical tube and a second cylindrical tube that is coaxially disposed in the first tube. The inner diameter of the first tube is greater than the outer diameter of the second tube. Disposed in the first tube is a swirl producer that comprises a ring of swirl vanes secured onto a hub. The first and second cylindrical tubes are provided on their ends that face away from one another with a connector that is insertable into a steam line that conveys the wet steam. The first and second cylindrical tubes are sealingly surrounded by a casing that is provided with a water drain and is radially spaced from the tubes to form a separation chamber. A lower pressure is maintained in the separation chamber than in the cylindrical tubes in that the separation chamber is connected via a return line with the interior of the hub of the swirl producer, with the hub being closed off on the inlet side and being open on the outlet side.

10 Claims, 3 Drawing Sheets

CENTRIFUGAL SEPARATOR FOR SEPARATING OFF WATER

BACKGROUND OF THE INVENTION

The present invention relates to a centrifugal separator for separating water out of wet steam, and includes a first cylindrical tube and a second cylindrical tube that is coaxially disposed relative to the first cylindrical tube, whereby the inner diameter of the first cylindrical tube is greater than the outer diameter of the second cylindrical tube, and wherein there is disposed in the first cylindrical tube a swirl producer that is comprised of a ring of swirl vanes that are secured upon a hub.

Such separators are used in steam generating plants having steam bleed lines in order to lower the water fraction in the wet steam and to thereby protect the tubular lines and the turbines from erosion due to drops of water. With one known centrifugal separator (EP-A-0 002 235, EP-B-0 005 494) there is provided within a tank a plurality of narrow tubes in each of which is disposed a swirl producer. This manner of construction is complicated and expensive because it leads to a large-volume structural unit that must be supported in the plant separate from the steam line. Furthermore, the driving or booster steam that is required for the withdrawal of the water that has been separated off, is withdrawn to the outside to a location within the steam generating plant having an appropriately low pressure.

It is therefore an object of the present invention to improve a centrifugal separator of the aforementioned general type in such a way that it can have a compact construction and without additional support can be installed into the wet steam line.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
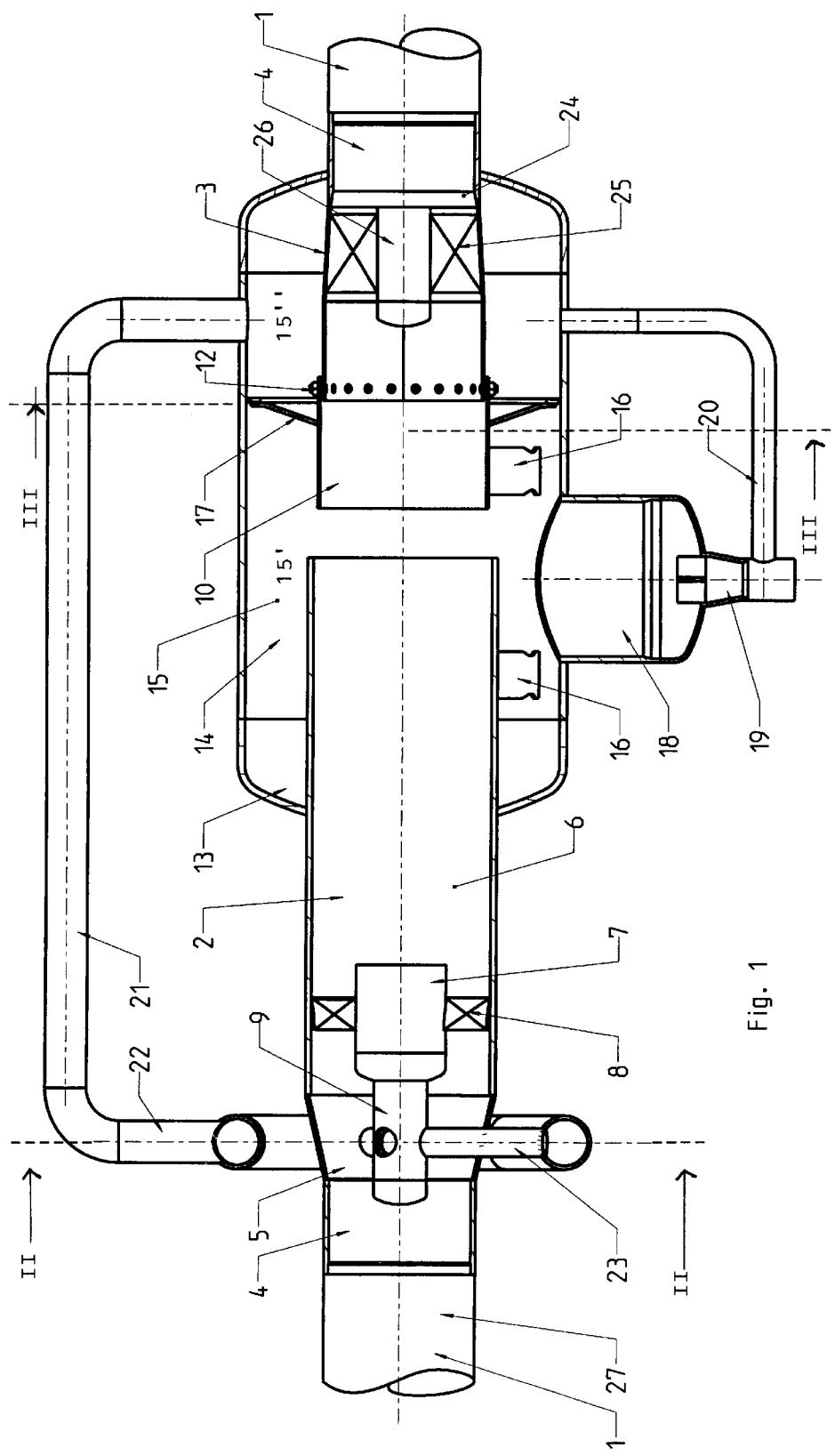
FIG. 1 is a longitudinal cross-sectional view of one exemplary embodiment of an inventive centrifugal separator.
Figure 2:
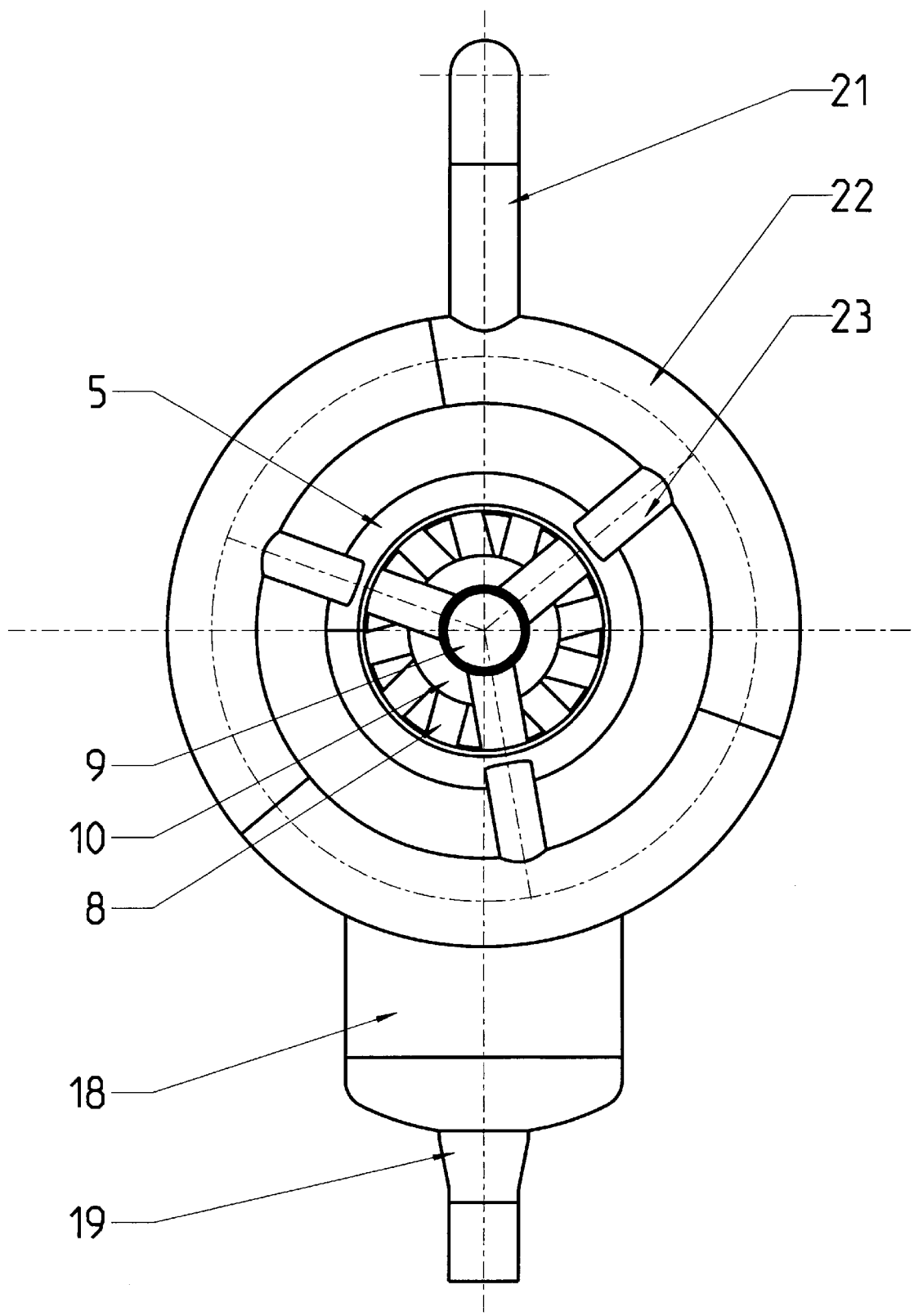
FIG. 2 is a cross-sectional view taken along the line II—II in FIG. 1.

The centrifugal separator of the present invention is characterized primarily in that those ends of the first and second cylindrical tubes that face away from one another are provided with a connector that is insertable into a steam line that conveys the wet steam; in that the first cylindrical tube and the second cylindrical tube are at least partially sealingly surrounded by a casing that is radially spaced from the tube and thereby forms a separation chamber; in that the casing is provided with a water drain; and in that a lower pressure than in the cylindrical tubes is maintained in the separation chamber in that the separation chamber is connected via a return line with the interior of the hub of the swirl producer, with such hub being closed on the inlet or upstream side and being open on the downstream or outlet side.

The inventive centrifugal separator is comprised of a single cyclone, which results in a simple and sturdy configuration that is characterized by a very compact manner of construction. Due to its dimensions, this centrifugal separator can be inserted into the wet steam line in the manner of a tubular section. Thus, the inventive centrifugal separator is also suitable for retrofitting existing steam generation units in order to increase its efficiency where the design is other than optimum. The inventive centrifugal separator operates without internal extraction steam in order to withdraw the separated-off water.

Further specific features of the present invention will be described in detail subsequently.

DESCRIPTION OF PREFERRED EMBODIMENTS

Referring now to the drawings in detail, in a steam or vapor line 1, which extends horizontally, vertically or at an angle, wet steam or vapor, for example from the bleed line of a steam turbine or from a steam generator, is guided in a nuclear power plant. The wet steam can have a water fraction of from 12 to 15%. In order to protect the subsequent lines and the steam turbine from erosion due to the drops of water, the wet steam is supplied to a high-speed centrifugal separator that is disposed in the steam line 1.

The centrifugal separator is provided with a first cylindrical tube 2, and a second cylindrical tube 3 that is disposed coaxial relative to the first cylindrical tube 2. The ends of the cylindrical tubes 2, 3 that face away from one another are respectively provided with a connector 4 that is to be inserted into the steam line 1 that conveys the wet steam. The wet steam flows successively through the cylindrical tubes 2, 3. Provided between the connector 4 that is disposed on the inner side and the first cylindrical tube 2 is a conical intermediate piece 5 as an adaptation to the cross-sectional areas of the various tubes.

Disposed in the inlet portion of the first cylindrical tube 2 is a swirl producer 6. The swirl producer 6 is comprised of a hub 7, on which are secured fixed swirl vanes 8. The hub 7 is hollow, and is closed on the inlet side and open on the outlet side. On the inlet side, the hub 7 can be extended by a hub extension 9 having a smaller diameter.

Figure 3:
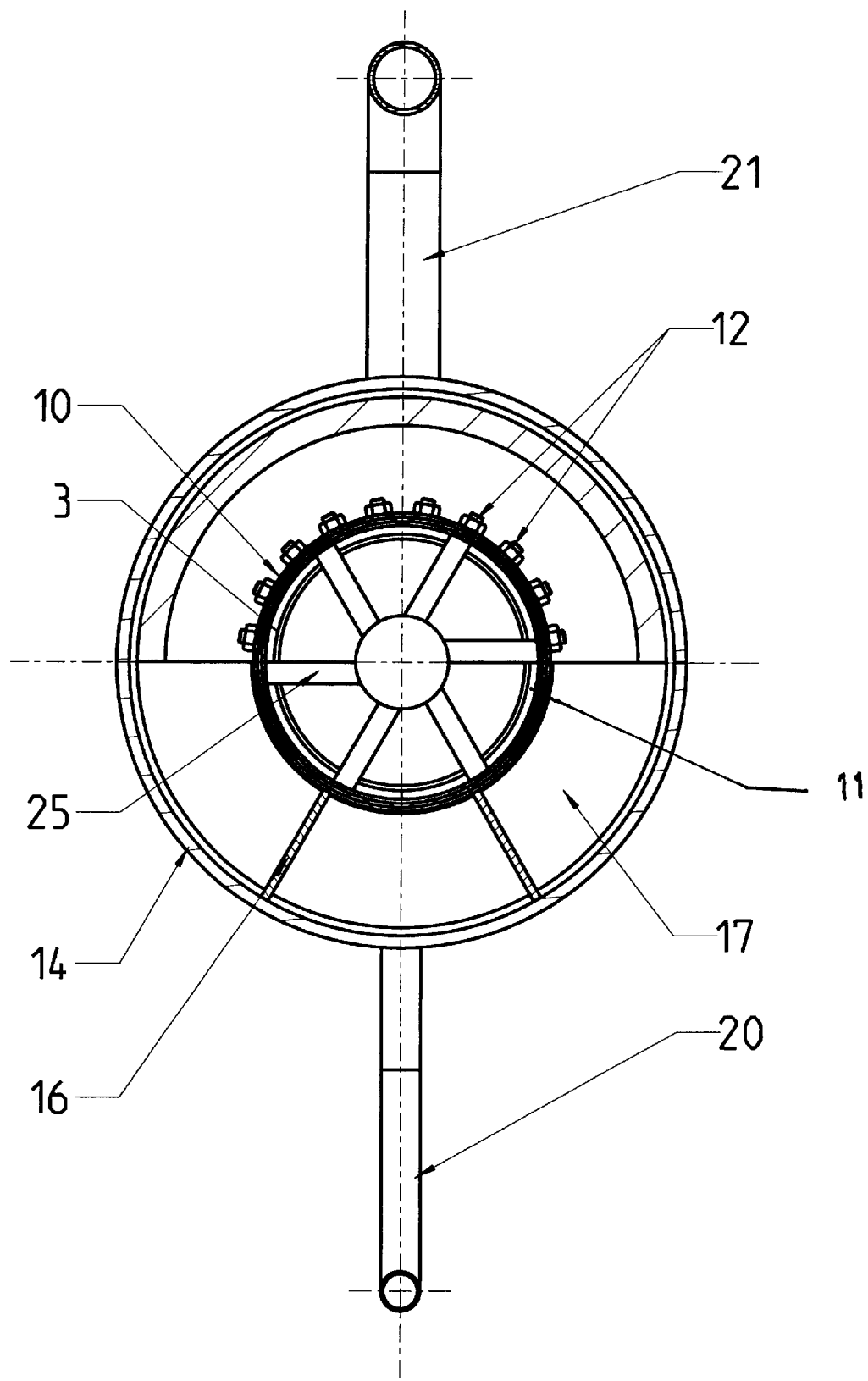
FIG. 3 is a cross-sectional view taken along the line III—III in FIG. 1.

The second cylindrical tube 3 is spaced axially from the first cylindrical tube 2. The inner diameter of the first cylindrical tube 2 is greater than the outer diameter of the second cylindrical tube 3. A third cylindrical tube 10 can be coaxially disposed between the first cylindrical tube 2 and the second cylindrical tube 3. The outer diameter of this third cylindrical 10 is less than the inner diameter of the first cylindrical tube 2, and the inner diameter of the third tube 10 is greater than the outer diameter of the second cylindrical tube 3. Those ends of the second and third cylindrical tubes 3, 10 that face one another are inserted into one another, as a result of which an annular gap 11 is formed (see FIG. 3). The ends of the two successive cylindrical tubes 3, 10 are interconnected by screws or bolts 12 that pass through the walls of the tubes. The first and the third cylindrical tubes, 2, 10 are axially spaced from one another, although their facing ends could also be inserted into one another.

The cylindrical tubes 2, 3, 10 are radially spaced from, and sealingly surrounded by, a casing 14 that is closed off by two ends or heads 13; as a consequence, a separation chamber 15 is formed between the casing 14 and the cylindrical tubes 2, 3, 10. The two outer cylindrical tubes 2, 3 are guided through the heads 13 and are secured therein. The cylindrical tubes 2, 10 are supported on the casing 14 by V-shaped ribs 16. At the same time, the ribs 16 serve to calm the flow within the separation chamber 15. A disk or similar member 17, which rests against the inner side of the casing 14 and against the outer side of the third cylindrical tube 10, or where the third tube 10 is not present against the outer side of the second cylindrical tube 3, divides the separation chamber 15 into a front and a rear partial chamber 15' and 15" respectively.

In the region of the front partial chamber 15', the casing 14 is provided with a water drain 18 to which is connected a discharge line 19. By means of a further discharge line 20, the rear partial chamber 15" is connected with the first mentioned discharge line 19.

The rear partial chamber 15" of the separation chamber 15 is connected via a return line 21 to an annular conduit 22 that surrounds the casing 14. Connected to the annular conduit 22 are a plurality of connecting lines 23 that are guided through the casing 14 and open out into the interior of the hollow hub 7 or of the hub extension 9 of the swirl producer 6 upstream of the swirl vanes 8.

Disposed in the last or second cylindrical tube 3 is a rectifier 24. The rectifier 24 can be embodied as a ring of fixed swirl vanes 25 that are secured to a hub 26. The direction of rotation of the swirl vanes 25 of the rectifier 24 is counter to the direction of rotation of the swirl vanes 8 of the swirl producer 6 in the inlet portion of the centrifugal separator. The hub 26 of the rectifier 24 has a smaller diameter than does the hub 7 of the swirl producer 6.

An agglomerator 27 of known construction can be disposed upstream of the swirl producer 6. The agglomerator 27 is comprised of suitable components, such as, for example, a grid of parallel wavy plates. The agglomerator 27 serves to increase the size of the drops of water in the wet steam, and to establish a predetermined drop spectrum on which the swirl producer 6 is designed in order to increase its degree of separation.

The dimensions of the centrifugal separator are characterized by the following dimensions:

$$D/L = \tfrac{1}{2} \text{ to } 5$$

$$d/D \geq \tfrac{1}{3}$$

Where:
D is the diameter of the steam line 1,
L is the length of the centrifugal separator between the connection locations of the steam line 1, and
d is the diameter of the hub 7 of the swirl producer 6.

In the swirl producer 6 of the centrifugal separator, a radial velocity is superimposed over the axial velocity of the wet steam. As a consequence of the thus-produced swirl flow having a radial component, the water drops contained in the wet steam are centrifuged outwardly against the wall of the first cylindrical tube 2. The water that arrives at the wall enters into the separation chamber 15 and is withdrawn from the separation chamber 15 as a calmed flow. The inwardly displaced stream of steam, which is freed of water, exits the second cylindrical tube 3 and, prior to exiting, can have the swirl removed therefrom by the selective provision of the rectifier 24.

An exhaustion out of the annular gap 11, which is formed between the third and the second cylindrical tubes 10, 3, serves to increase the degree of separation. In order to withdraw the water through the annular gap 11, the rear partial chamber 15" of the separation chamber 15 is subjected to a partial vacuum. This partial vacuum is produced internally in the centrifugal separator, and in particular via the return line 21, the annular conduit 22, the connecting lines 23, and the connection to the interior of the hollow hub 7 or the hub extension 9. Due to the radial velocity produced in the swirl producer 6, there results behind the hub 7 a pressure profile with an underpressure in the region of the hub. Thus, the necessary driving or booster steam is achieved for the withdrawal of the water out of the annular gap exhaustion with an internal recirculation of steam.

The specification incorporates by reference the disclosure of German priority document 101 29 198.1 filed Jun. 19, 2001

The present invention is, of course, in no way restricted to the specific disclosure of the specification and drawings, but also encompasses any modifications within the scope of the appended claims.

We claim:

1. A centrifugal separator for separating water out of wet steam, comprising:
    a first cylindrical tube;
    a second cylindrical tube that is disposed coaxially relative to said first cylindrical tube, wherein said first cylindrical tube has an inner diameter that is greater than an outer diameter of said second cylindrical tube;
    a swirl producer disposed in said first cylindrical tube, wherein said swirl producer comprises a hub and a ring of swirl vanes that are secured to said hub, and wherein said hub is closed on an upstream side and is open on a downstream side;
    respective connectors provided at ends of said first and second cylindrical tubes that face away from one another, wherein said connectors are insertable into a steam line that conveys wet steam; and
    a casing that is radially spaced from and sealingly at least partially surrounds said first and second cylindrical tubes to thereby form a separation chamber, wherein said casing is provided with a water drain, and wherein said separation chamber is connected via a return line to an interior of said hub to thereby during operation enable maintenance in said separation chamber of a lower pressure than in said first and second cylindrical tubes.

2. A centrifugal separator according to claim 1, wherein a third cylindrical tube is coaxially disposed between said first cylindrical tube and said second cylindrical tube, wherein said third cylindrical tube has an outer diameter that is less than said inner diameter of said first cylindrical tube, and wherein said third cylindrical tube has an inner diameter that is less than said outer diameter of said second cylindrical tube.

3. A centrifugal separator according to claim 2, wherein a disk is placed upon said third cylindrical tube or said second cylindrical tube, and wherein said disk separates said separation chamber into a front partial chamber and a rear partial chamber.

4. A centrifugal separator according to claim 2, wherein at least some of said cylindrical tubes are supported on said casing via streamlined ribs.

5. A centrifugal separator according to claim 2, wherein facing ends of two of said cylindrical tubes that follow one another are inserted into one another and are interconnected by screws that pass through said ends of said cylindrical tubes.

6. A centrifugal separator according to claim 2, wherein two successive ones of said cylindrical tubes are axially spaced form one another.

7. A centrifugal separator according to claim 1, wherein a rectifier is disposed in a downstream one of said cylindrical tubes, wherein said rectifier comprises a ring of swirl vanes, and wherein said swirl vanes of said rectifier have a direction of rotation that is counter to a direction of rotation of said swirl vanes of said swirl producer.

8. A centrifugal separator according to claim 1, wherein a drop agglomerator is disposed upstream of said swirl producer.

9. A centrifugal separator according to claim 1, wherein said connectors have a diameter that forms a ratio of 1:2 to 5 to a length of said centrifugal separator.

10. A centrifugal separator according to claim 1, wherein a ratio between a diameter of said hub of said swirl producer and a diameter of said connector is greater than 1:3.

* * * * *

UNITED STATES PATENT AND TRADEMARK OFFICE
CERTIFICATE OF CORRECTION

PATENT NO.    : 6,620,217 B2
DATED         : September 16, 2003
INVENTOR(S)   : Bruckmann et al.

It is certified that error appears in the above-identified patent and that said Letters Patent is hereby corrected as shown below:

<u>Title page,</u>
Item [75], should read as follows:
-- [75] Inventors: Willi Bruckmann, Oberhausen (DE); Martin Kienböck, Ratingen (DE) --

Signed and Sealed this

Sixteenth Day of December, 2003

JAMES E. ROGAN
*Director of the United States Patent and Trademark Office*